(12) United States Patent
Scott et al.

(10) Patent No.: US 7,975,874 B2
(45) Date of Patent: Jul. 12, 2011

(54) BRACKET AND HANDLE FOR COOKING VESSEL

(76) Inventors: Ian Scott, Newman Lake, WA (US); David Burgett, Newman Lake, WA (US); Kurt Gauss, Spokane, WA (US)

( * ) Notice: Subject to any disclaimer, the term of this patent is extended or adjusted under 35 U.S.C. 154(b) by 353 days.

(21) Appl. No.: 12/228,123

(22) Filed: Aug. 11, 2008

(65) Prior Publication Data

US 2010/0031475 A1 Feb. 11, 2010

(51) Int. Cl.
*B65D 25/10* (2006.01)
*B65D 53/00* (2006.01)
*B65D 81/24* (2006.01)

(52) U.S. Cl. .......... 220/759; 220/573.1; 16/425

(58) Field of Classification Search ........ 220/573.1, 220/757, 759; 16/425
See application file for complete search history.

(56) References Cited

U.S. PATENT DOCUMENTS

| | | |
|---|---|---|
| 41,652 A | 2/1864 | Temeson |
| 643,492 A | 2/1900 | Fromholz |
| 1,268,089 A | 6/1918 | Borsse |
| 1,406,826 A | 2/1922 | Dugger |
| 2,092,198 A | 9/1937 | Anderson |
| 2,368,297 A | 1/1945 | Hanke |
| 3,108,316 A | 10/1963 | Peale |
| 3,306,648 A | 2/1967 | Serio |
| 3,334,782 A | 8/1967 | Friberg |
| 3,798,706 A * | 3/1974 | Wolfson et al. ......... 220/759 |
| 5,048,882 A * | 9/1991 | Fielding et al. ............ 294/33 |
| 5,660,300 A | 8/1997 | Demetrio |
| 6,173,860 B1 | 1/2001 | Lamers |
| 6,250,493 B1 * | 6/2001 | Kwan ..................... 220/759 |
| 6,257,439 B1 | 7/2001 | Hsu |
| 6,694,868 B1 | 2/2004 | Hung |
| 6,708,373 B2 | 3/2004 | Dodane |
| 7,481,330 B2 * | 1/2009 | Lorthioir et al. ......... 220/759 |

* cited by examiner

*Primary Examiner* — Anthony Stashick
*Assistant Examiner* — Harry A Grosso
(74) *Attorney, Agent, or Firm* — Lukins & Annis, PS; William A. Jeckle

(57) ABSTRACT

A cooking vessel bracket and handle provides a first handle portion and a second handle portion each having opposing end portions, parallel spaced apart sides and a back defining a channel between the ends. First handle has handle flanges at first end portion and locking seat at second end portion. Second end portion of first handle and first end portion of second handle are pivotally interconnected for first handle to optionally fold into channel of second handle. Spring biased locking pin within channel of first handle protrudes from first handle between the handle flanges for releasable engagement with pot bracket carried by vessel and operatively communicates with a thumb slide for axial movement in channel. Spring biased handle lock in second handle channel releasably engages with locking seat of first handle to secure the first handle and second handle in extended end to end alignment for use.

11 Claims, 4 Drawing Sheets

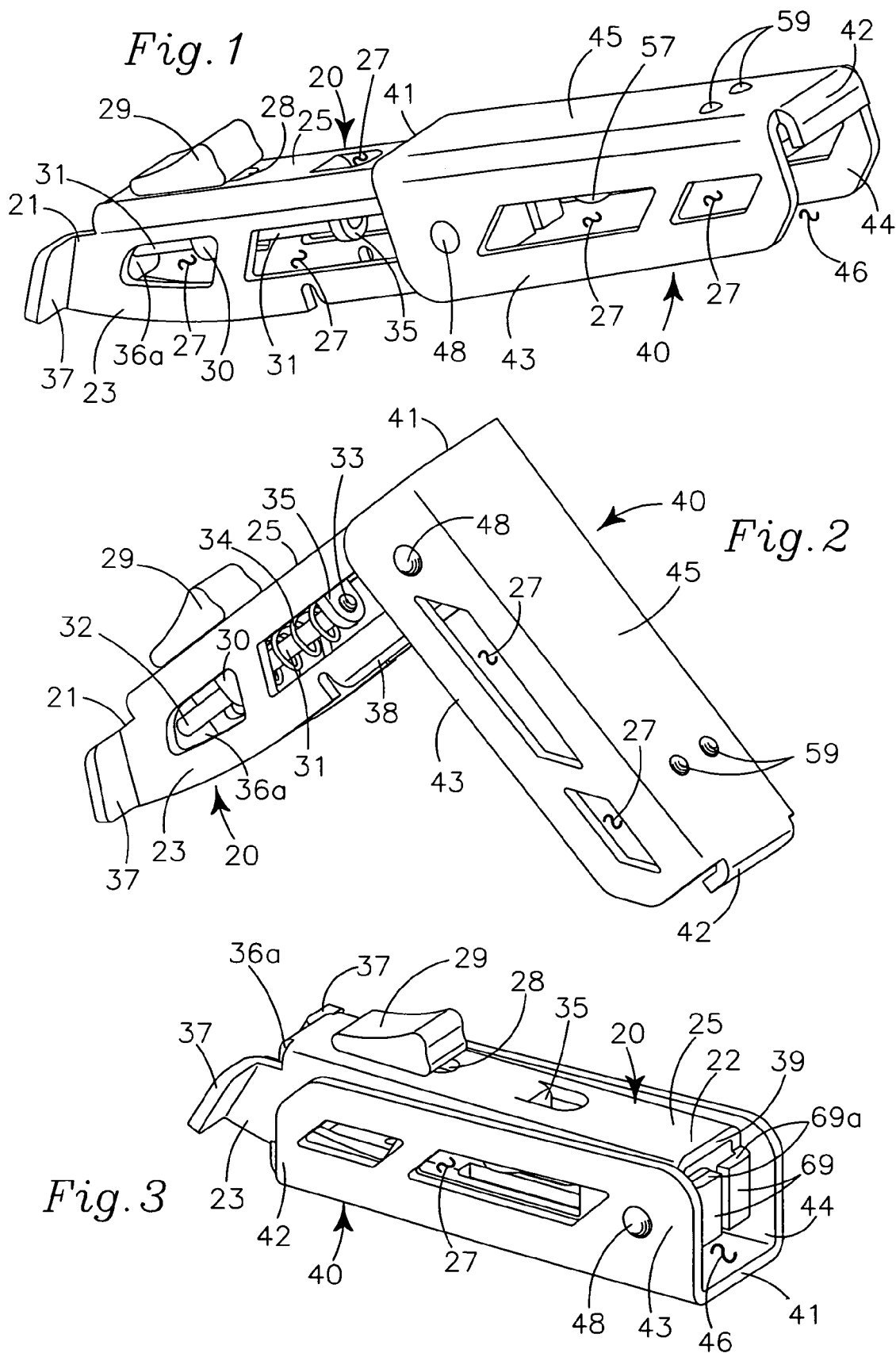

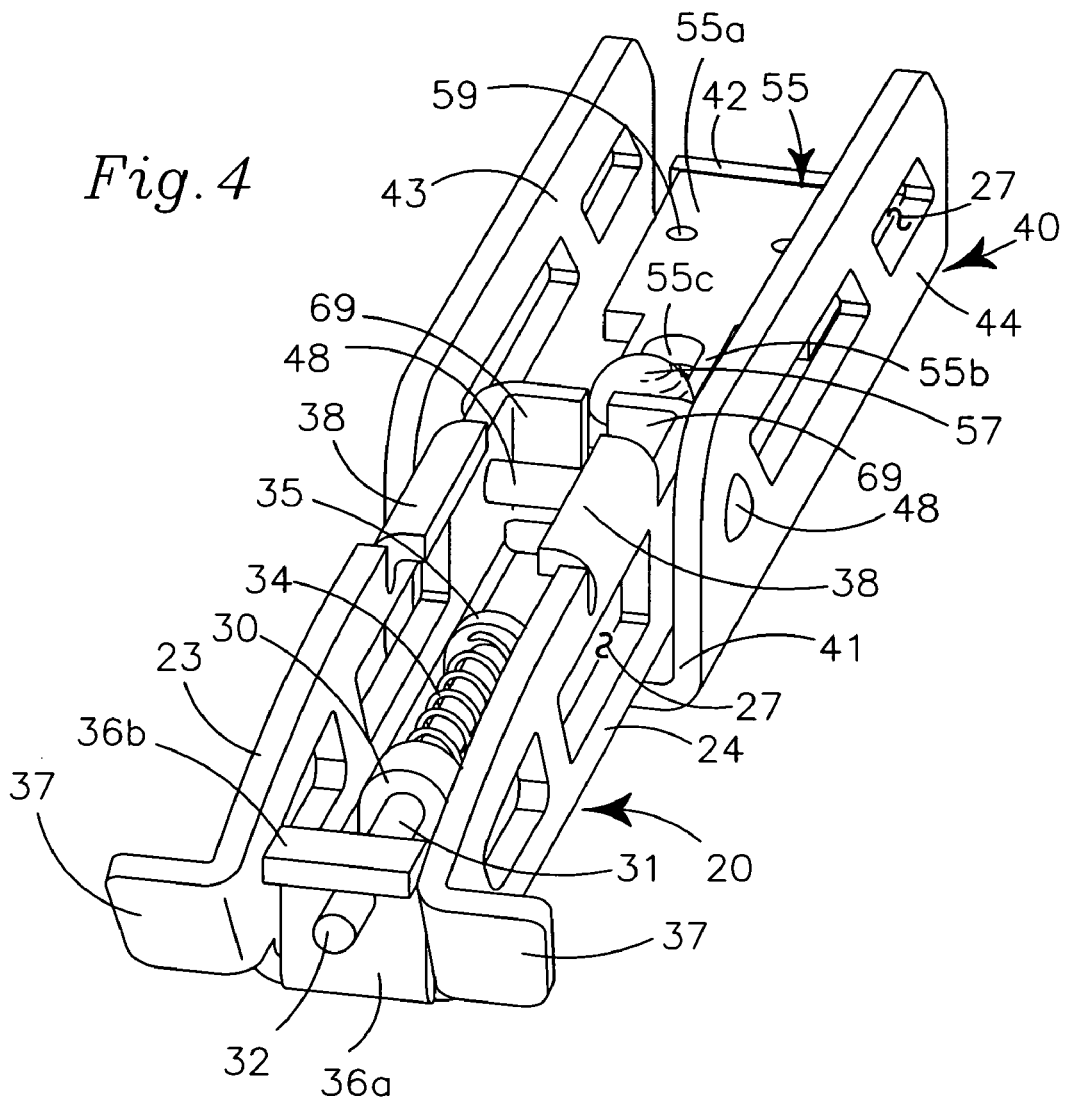
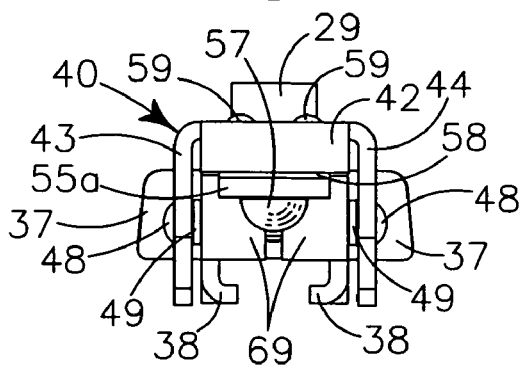
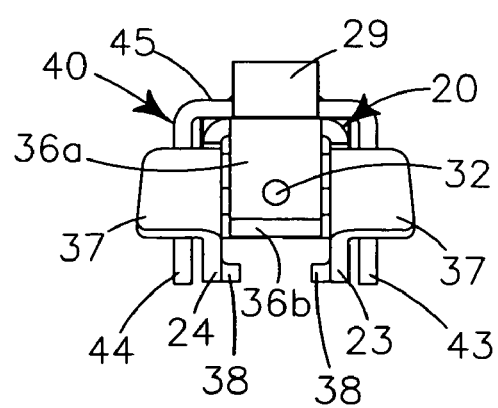

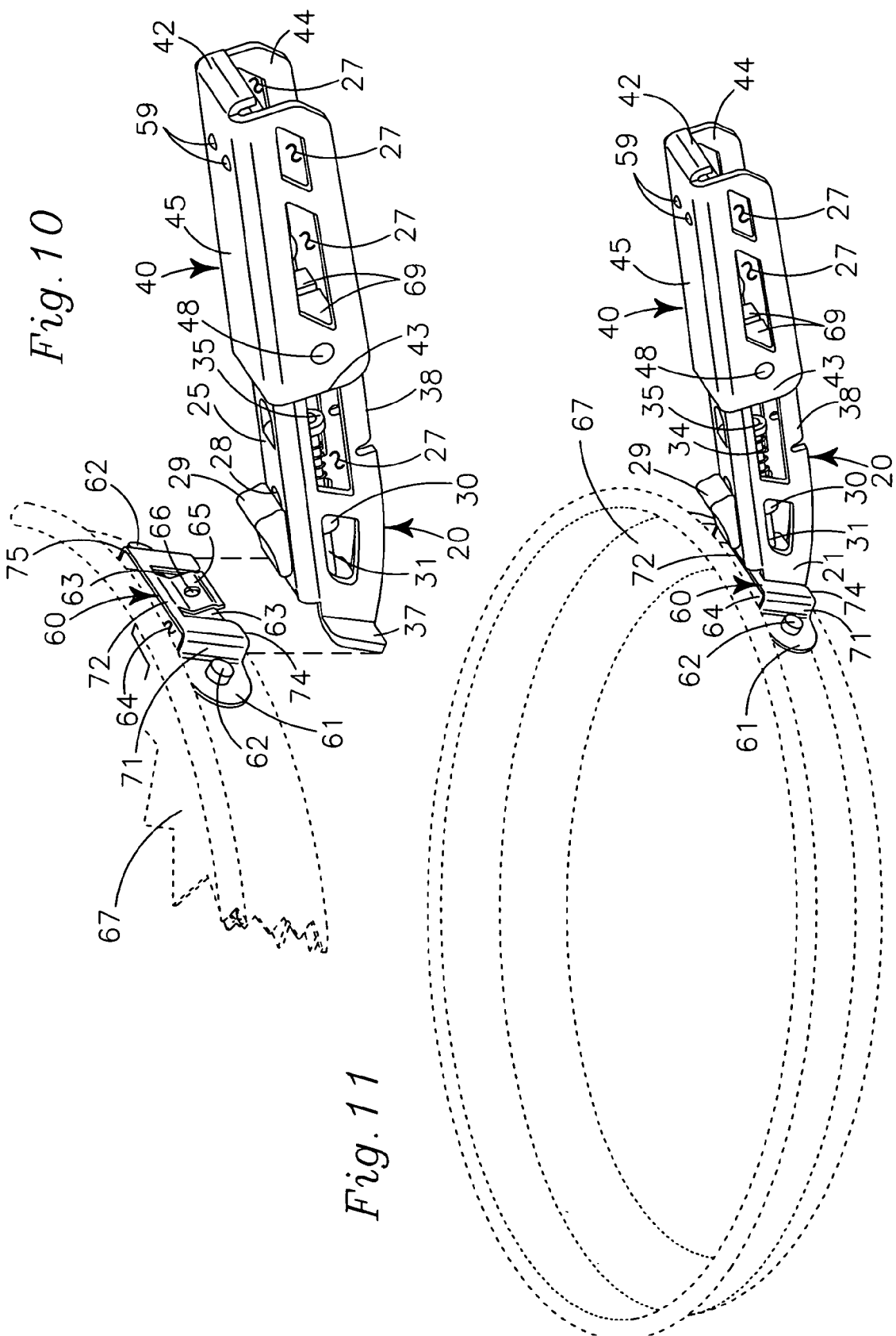

BRACKET AND HANDLE FOR COOKING VESSEL

BACKGROUND OF INVENTION

A. Related Applications

There are no applications related hereto heretofore filed in this or in any foreign country.

B. Field of Invention

This invention relates to receptacles, and more particularly to a vessel attachment forming a removable variable sized handle.

C. Background and Description of Prior Art

Cooking vessels and cook sets are essential equipment for outdoor activities such as camping and especially for backpacking enthusiasts. In addition to size and weight considerations, cook sets must be durable, strong, reliable and should not have parts that can be easily lost or misplaced. Because cook sets are used to prepare, contain and carry solid and liquid food-stuffs that may be heated to high temperatures, handles for manipulating cook set components such as pots and pans must be sturdy and reliable.

Stacking or nesting cook sets, wherein plural elements may be carried one-within-another, to conserve space are known in the prior art, for example aluminum Boy Scout® cook sets. Unfortunately, stacking and nesting pots and pans and the like, hereinafter referred to as vessels, to conserve space requires that handles for the vessels be removed when the vessels are stacked/nested and the handles must thereafter be reattached to the vessels prior to use. Detachment and reattachment of the handles for transport and use, respectively, requires that each vessel have its own handle, which is contrary to the goal of reducing weight and mass.

Universal vessel handles that may be used with a variety of vessels are known, and avoid the need to carry multiple handles. Universal handles generally function in one of two ways. First, universal handles may be constructed of spring steel with retentive memory and formed into a general "U" shape with two spaced apart parallel elongated legs, each leg having a perpendicularly extending prong at an end opposite the end portion interconnecting the elongate legs. The prongs releasably engage with a pair of spaced apart radially extending loops protruding from a bracket fastened to an outer circumferential surface of a vessel. The retentive memory of the material forming the handle maintains the engagement of the prongs with the bracket loops. A second type of universal handle operates on the same principle as a hand-tool "pliers" but the jaws and handles are oriented vertically to grasp an upper circumferential edge of a vessel. The user's squeezing together of the handles provides the grip on the vessel edge.

Universal handles unfortunately have various drawbacks. The spring biased type universal handles are flimsy and to do not provide a secure attachment to the vessel, especially when the vessel is tipped or rotated such as to pour contents into another container. Pliers type universal handles provide more stability in handling a vessel, but only engage with the vessel when the user is actively squeezing the handles together. Even a momentary and unintentional release of operator supplied tension on the handles allows the handles to disengage from the vessel perhaps leading to accidents and injuries.

Semi-permanent vessel handles are also known, such as handle brackets of Boy Scout cook sets that are interconnected to vessels by means of a finger tightened wing-nut on a bolt to form a radially extending vessel handle.

Semi-permanent handles have various drawbacks as well. The handles can be difficult to secure to the cooking utensil, the finger tightened wing-nut may loosen with use leading to an unstable handle, one or more of the interconnecting pieces may be lost making the cook set unusable and the semi permanent nature of the attaching means necessitates that a handle be available for each vessel because changing the handle from vessel to vessel is not practical when the vessel is hot or being heated.

What is needed is a cooking vessel handle that may be quickly and securely attached to a cooking vessel and also quickly and easily detached therefrom without the need to touch the possibly hot cooking vessel. The handle must be sturdy, small and lightweight to satisfy a primary need of backpackers, the handle must not have parts and portions that can be lost, and the handle must permit the cooking vessel to be manipulated as needed, such as tipping to pour its contents and the like.

Our invention overcomes various of the aforementioned drawbacks by providing an improved pot bracket and a variable size cooking vessel handle that is quickly and easily attachable to a variety of cooking vessels having the pot bracket. The handle securely attaches to the cooking vessel and will not inadvertently or unintentionally detach therefrom, and eliminates the need to carry multiple vessel handles. Further, the present invention is foldable so that it can be stored and carried within the confines of the cook set with which it is used. Although primarily designed for use with camping cook sets, our invention is equally well suited for use with household cooking utensils.

Our invention does not reside in any single one of the identified features individually but rather in the synergistic combination of all of its structures, which give rise to the functions necessarily flowing therefrom as hereinafter claimed.

SUMMARY

A vessel bracket and handle provides a first handle and a second handle each having opposing end portions and each defining a medial channel therebetween. First handle has handle flanges at first end portion and locking seat at second end portion. Second end portion of first handle and first end portion of second handle are pivotally interconnected for first handle to optionally fold into channel of second handle. Spring biased locking pin within channel of first handle protrudes from first handle between the handle flanges for releasable engagement with pot bracket carried by vessel and operatively communicates with a thumb slide for axial movement in the channel. Spring biased handle lock in second handle channel releasably engages with locking seat of first handle to secure the first handle and second handle in extended end-to-end alignment for use.

In providing such an system it is:

a principal object to provide a handle that securely attaches to a pot bracket carried by a vessel.

a further object to provide a vessel handle that is foldable.

a further object to provide a vessel handle that is lightweight.

a further object to provide a vessel handle that allows an attached vessel to be manipulated to pour contents therefrom.

a further object to provide a vessel handle that does not require user supplied tension to remain engaged with a vessel.

a further object to provide a vessel handle that will not inadvertently detach from a vessel.

a further object to provide a vessel handle that does not have detachable pieces that are susceptible to loss.

a further object to provide such a vessel handle that inhibits heat conduction from vessel to handle.

a further object to provide such a vessel handle that may be stored within a nested vessel.

a further object to provide such a vessel handle that may be used with a plurality of vessels.

a further object to provide such a vessel handle that eliminates the need for multiple vessel handles.

a further object to provide such a vessel handle that locks in an extended configuration.

a still further object to provide such a vessel handle that is ergonomic in design.

Other and further objects of our invention will appear from the following specification and accompanying drawings which form a part hereof. In carrying out the objects of our invention it is to be understood that its structures and features are susceptible to change in design and arrangement with only one preferred and practical embodiment of the best known mode being illustrated in the accompanying drawings and specified as is required.

BRIEF DESCRIPTIONS OF DRAWINGS

In the accompanying drawings which form a part hereof and wherein like numbers refer to similar parts throughout:

FIG. 1 is an isometric side, top and second end view of our handle for a vessel shown in an extended locked configuration.

FIG. 2 is an isometric side and top view of our handle for a vessel shown in a partially folded configuration.

FIG. 3 is an isometric side and top view of our handle for a vessel shown in a folded configuration.

FIG. 4 is an enlarged isometric bottom, side and first end view of our handle for a vessel.

FIG. 8 is an orthographic second end view thereof.

FIG. 9 is an orthographic first end view thereof.

FIG. 10 is a partial cutaway isometric view similar to that of FIG. 1 showing the handle proximate to a pot bracket carried on outer circumferential surface of a vessel.

FIG. 11 is an isometric view similar to that of FIG. 10 showing the handle interconnected to the pot bracket carried by a frying pan type vessel shown in dashed outline.

DESCRIPTION OF PREFERRED EMBODIMENT

Figure 5:
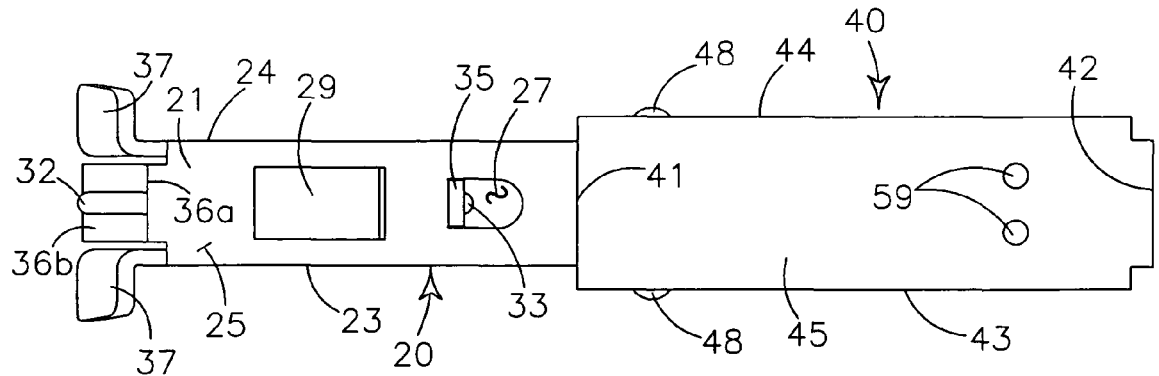
FIG. 5 is an orthographic top view of our handle for a vessel.

Our bracket and handle for a cooking vessel generally provides a pot bracket 60 rigidly interconnected to a vessel 67 and a handle having a first handle portion 20 releasably interconnected to the pot bracket 60 and a second handle portion 40 pivotally interconnected to the first handle portion 20 opposite the pot bracket 60.

The first handle portion 20 has a first end portion 21 and an opposing second end portion 22. A channel 26 is defined between first end portion 21 and second end portion 22 by first side 23, spaced apart parallel second side 24 and back 25 that structurally interconnects the first side 23 and the second side 24 along proximate elongate edge portions.

Figure 6:
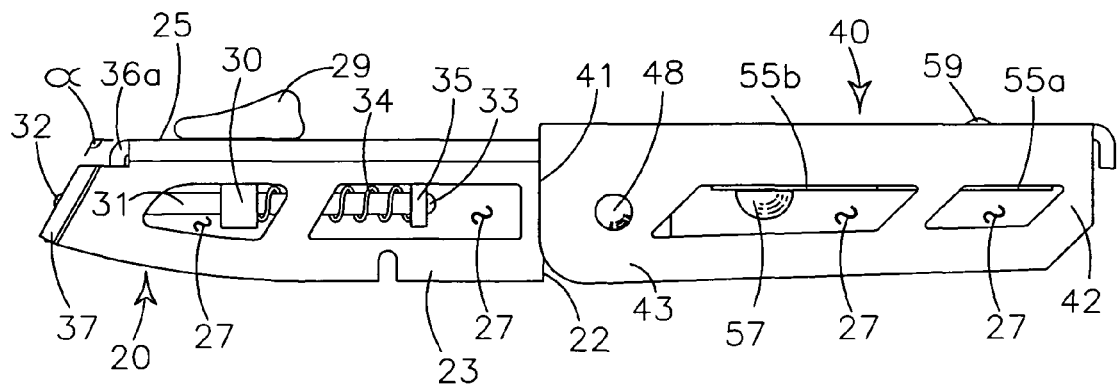
FIG. 6 is an orthographic side view thereof, the opposing side being the same.

Plural spacedly arrayed cooling orifices 27 are defined in the first side 23, second side 24 and back 25 to reduce heat conduction from first end 21 to second end 22 and to reduce weight. A handle flange 37 is structurally carried by the first side 23 and the second side 24 at the first end portion 21. Each handle flange 37 extends generally perpendicularly from the respective side 23, 24 opposite the channel 26 and is angulated relative to the back 25 at obtuse angle α (FIG. 6) which is preferably 111.85 degrees to ensure the first handle 20 angles upwardly from the pot bracket 60 and vessel 67 to prevent hot liquids and the like from dripping down the handles 20, 40 with gravity which might cause injury.

Locking pin 31 is axially movably carried within channel 26 and is supported at first end portion 32 and opposing second end portion 33 by front locking pin support 36a and rear locking pin support 35 respectively. The front locking pin support 36a is structurally carried by the back 25 at the first end portion 21 and extends generally perpendicularly downwardly from the back 25 across the channel 26 spacedly adjacent and between the two handle flanges 37. Horizontal ledge 36b is carried by the front locking pin support 36a opposite the back 25 and extends forwardly and generally perpendicularly from the front locking pin support 36a. The horizontal ledge 36b is a limit for the pot bracket 60 and facilitates alignment of the locking pin 31 with a locking pin hole 66 defined in the pot bracket 60.

The rear locking pin support 35 is rigidly carried within the channel 26 spaced apart from the front locking pin support 36a and may be formed by cutting a "U" shaped open curve in the back 25, and bending the attached "U" shaped portion downwardly into the channel 26.

The locking pin 31 is axially movable within the channel 26 relative to the front locking pin support 36a and the rear locking pin support 35 in aligned holes (not shown) defined in the locking pin supports 36a, 35. Thumb slide 29 is carried in thumb slide slot 28 defined in the back 25 and has a thumb slide base 30 communicating with the locking pin 31 between the front locking pin support 36a and the rear locking pin support 35. The thumb slide 29 is movable forwardly and rearwardly in the thumb slide slot 28 and the interconnection of the thumb slide base 30 with the locking pin 31 communicates movement of the thumb slide 29 to the locking pin 31.

Locking pin biasing spring 34, which is preferably a stainless steel coil spring, is carried by the locking pin 31 between the thumb slide base 30 and the rear locking pin support 35. The biasing spring 34 biases the thumb slide base 30, the interconnected thumb slide 29 and the locking pin 31 to a forward position wherein first end portion 32 of the locking pin 31 extends forwardly and outwardly from the first handle 20 through the front locking pin support 36a between the handle flanges 37. In an alternative embodiment, a biasing spring (not shown) that is resistant to extension, as opposed to compression, may also or alternatively, be carried on the locking pin 31 between the thumb slide base 30 and the forward locking pin support 36a to bias the locking pin 31 to a forwardly extended position.

Locking bracket seat 39 is formed in the second end portion 22 of the first handle portion 20 adjacent the back 25. End portions of the first side 23 and the second side 24 proximate second end portion 22 form flanges 69 that extend transversely partially across the channel 26 spacedly adjacent and spacedly below second end portion of the back 25. Edge portion 69a, proximate the back 25, of each flange 69 forms bottom edge portion of the locking bracket seat 39 for engagement with handle lock 50.

Finger flanges 38 are formed in elongate edge portions of the first side 23 and second side 24 proximate the second end portion 22, and opposite the back 25, by bending the elongate edge portions into a rounded corner such that a portion of each side 23, 24 extends perpendicularly partially across the channel 26. The finger flanges 38 provide user comfort while using the handle.

The second handle portion 40 has a first end portion 41 and an opposing second end portion 42. A channel 46 is defined between the first end portion 41 and the second end portion 42 by first side 43, spaced apart parallel second side 44 and back 45 that structurally interconnects the first side 43 and the second side 44 along proximate elongate edge portions. Plural spacedly arrayed cooling orifices 27 are defined in the first side 43 and second side 44 to minimize heat conduction and to reduce weight.

The second end portion 22 of the first handle portion 20 and the first end portion 41 of the second handle portion 40 are pivotally interconnected by pin hinge 48 that extends through aligned holes (not shown) defined in the first and second sides 23, 24 respectively of the first handle portion 20 and in the first and second sides 43, 44 respectively of the second handle portion 40. As shown in FIGS. 2 and 3, the pin hinge 48 allows the first handle portion 20 to be folded into and carried within channel 46 of the second handle portion 40 effectively halving the length of the handle to ease storage and transport. Washers 49 that may be heat insulating and/or self lubricating are carried on the pin hinge between the adjacent side portions 23, 43 and 24, 44 to minimize heat conduction from the first handle portion 20 to the second handle portion 40 and to ensure freedom of movement between the handle portions 20, 40 for folding and extending.

Handle lock base 58 (FIG. 8), for supporting handle lock 50, is carried within channel 46 spacedly adjacent the second end portion 42. The handle lock base 58 is rectilinear and defines an alignment rod hole (not shown) therethrough that is axially aligned with channel 46. Handle lock 50 is carried within channel 46 between the handle lock base 58 and the first end portion 41.

Figure 7:
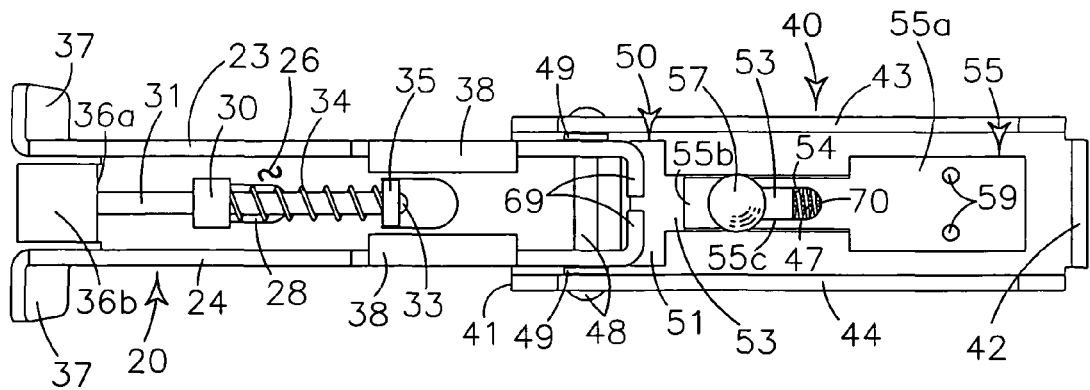
FIG. 7 is an orthographic bottom view thereof.

As shown in FIG. 7, the handle lock 50 has a general "T" configuration with a transversely extending forward end portion 51, a leg portion 53 extending perpendicularly rearwardly therefrom, and an alignment rod 70 extending axially from the leg portion 53 opposite the forward end portion 51. Forwardmost edge (not shown) of the transversely extending forward end portion 51 is "bull-nosed" to facilitate engagement with the locking bracket seat 39. The alignment rod 70 is movably axially carried in the alignment rod hole (not shown) defined in the handle lock base 58 causing the handle lock 50 to remain aligned within channel 46 and to prevent "binding" which might occur if the handle lock 50 were to twist relative to the channel 46. Biasing spring 54, which is preferably a stainless steel coil spring, is carried on the alignment rod 70 between the handle lock base 58 and the leg portion 53 biases the handle lock 50 toward the first end portion 41 and into engagement with the locking bracket seat 39.

As shown in FIG. 7, handle lock guide 55 having a base portion 55a proximate the second end 42 and a leg portion 55b defining an elongated hole 55c is releasably secured to the handle lock base 58 with fasteners 59 extending through holes (not shown) defined in the base portion 55a to secure the handle lock 50 and the handle lock guide 55 to the handle lock base 58 within channel 46.

Thumb grip 57 is interconnected with the leg portion 53 of the handle lock 50 and extends through the elongated hole 55c. Thumb grip 57 allows an operator to overcome biasing of spring 54 to withdraw the transverse forward end portion 51 of the handle lock 50 from the locking bracket seat 39. When the transverse forward end portion 51 of the handle lock 50 is not engaged with the locking bracket seat 39, the first handle portion 20 may be folded into the channel 46 of the second handle portion 40. (FIG. 3). The "bull nose" forward edge portion 51 of the handle lock 50 minimizes any binding that might occur as the first handle portion 20 and second handle portion 40 are pivoted relative to one another. The leg portion 53 of the handle lock 50 and the leg portion 55b of the handle lock guide 55 are narrower in side-to-side dimension than the transversely extending forward end portion 51 and the base portion 55a. The smaller side-to-side dimension of the leg portions 53, 55b provides spacing between the leg portions 53, 55b and the interior second handle portion 40 sides 43, 44 for the finger flanges 38 of the first handle portion 20 to be carried therebetween when the handle portions 20, 40 are folded.

As shown in FIG. 10, the pot bracket 60 is rigidly attached to outer circumferential surface of a vessel 67 with the fasteners 62 such as rivets or the like. The bracket 60 has minimal radial extension from the vessel 67 outer circumferential surface so that the vessel 67 can "nest" within another slightly larger vessel 67 to conserve space.

The pot bracket 60 (FIGS. 10, 11) is a channel-like member having two spaced apart parallel fastening tabs 61, two offsetting bends 71 and a medial portion 72 spaced apart from the circumferential surface of the vessel 67 by the offsetting bends 71 defining a channel 64 therebetween. Two spaced apart parallel slots 63 are defined in the medial portion 72, one slot 63 spacedly adjacent inward each offsetting bend 71. Each slot 63 communicates with bottom edge 74 of the medial portion 72 but does not communicate with top edge 75 of the medial portion 72. Bracket flange 65 defined by and between the two slots 63 is bent slightly radially inward toward the vessel 67 and defines a medial locking pin hole 66 for insertion of the forward end portion 32 of the locking pin 31.

Slots 63 and the channel 64 between the medial portion 72 and the outer circumferential surface of the vessel 67 enable the handle flanges 37 and the forward end portion of each side 23, 24 of the first handle portion 20 to engage with the pot bracket 60 and be carried within the channel 64. (FIG. 11).

First end portion 32 of the locking pin 31 extending outwardly from the front locking pin support 36a engages with the locking pin hole 66 defined in the bracket flange 65 to prevent the handle from disengaging from the pot bracket 60. The radial inward bend of the bracket flange 65 acts as a ramp for the locking pin 31 to slide upon and over and facilitates guiding the handle flanges 37 into the slots 63 and guiding the forward end portion 32 of the locking pin 31 into the locking pin hole 66.

The sides 23, 24 and back 25 of the first handle portion 20, and the sides 43, 44 and back 45 of the second handle portion 40 may be coated with a heat dissipating material that reduces heat conduction and enhances user gripping even when the handle is wet.

Having described the structure of our bracket and handle for a vessel its operation may be understood.

The first handle portion 20 is pivoted relative to the second handle portion 40 about pin hinge 48 so that the first handle portion 20 is aligned end-to-end with the second handle portion 40 and the transverse forward end portion 51 of the handle lock 50 engages in the locking bracket seat 39.

The second handle portion 40 is gripped by the user and the forward end portion 21 of the first handle portion 20 is positioned adjacent below a pot bracket 60 carried by a vessel 67. The handle flanges 37 of the first handle portion 20 are positioned below the bottom edge 74 of the pot bracket 67 and the sides 23, 24 of the first handle portion 20 are aligned with the slots 63 defined in the pot bracket 60. The handle is manipulated so that the handle flanges 37, and the side portions 23, 24 pass into the channel 64 and into the slots 63 respectively. The handle should be moved upwardly into the slots 63 and channel 64 until the horizontal ledge 36b of the front locking pin support 36a frictionally contacts the bottom edge 74 of the bracket flange 65 and the forward end portion 32 of the locking pin 31 engages with the locking pin hole 66 defined in the bracket flange 65. To promote engagement it may be necessary for the operator to draw the thumb slide 29 rearwardly so that the forward end portion 32 of the locking pin 31 is likewise drawn rearwardly to minimize frictional engagement with the bracket flange 65 prior to engagement. Once the locking pin 31 is engaged within the locking pin hole 66, the handle and interconnected vessel 67 may be used as desired.

To disconnect the handle from the vessel 67, the user grasps the handles 20, 40 and places his thumb on the thumb slide 29. The user draws the thumb slide 29 rearwardly toward the second end portion 22 of the first handle portion 20 overcoming the biasing of spring 34. Rearward movement of the thumb slide 29 causes the forward end portion 32 of the locking pin 31 to be withdrawn from the locking pin hole 66 defined in the bracket flange 65. The handle may then be manipulated vertically downwardly causing the handle flanges 37 and first handle sides 23, 24 to be withdrawn from the channel 64 and slots 63 respectively allowing the handle to be disengaged from the vessel 67.

For storage, the user places the handle so that the channels 26, 46 open upwardly. The user places his thumb on the thumb grip 57 and moves the thumb grip 57 rearwardly toward the second end portion 42 of the second handle 40. Rearward movement of the thumb grip 57 overcomes the biasing of spring 54 causing the transverse forward end portion 51 of the handle lock 50 to be withdrawn from the locking bracket seat 39. When the handle lock 50 has been withdrawn from the locking bracket seat 39, the first handle portion 20 and second handle portion 40 may be pivoted relative to one another about pin hinge 48 causing the first handle 20 to fold into and be carried within the channel 46 of the second handle portion 40. (FIG. 3). The folded vessel handle may be stored as desired such as within an innermost nested vessel.

The foregoing description of our invention is necessarily of a detailed nature so that a specific embodiment of a best mode may be set forth as is required, but it is to be understood that various modifications of details, and rearrangement, substitution and multiplication of parts may be resorted to without departing from its spirit, essence or scope.

We claim:

1. A removable folding handle and bracket for cooking vessels comprising in combination:
    a bracket on an outer circumferential surface of the vessel, the bracket defining a channel between the outer circumferential surface and the bracket, two spaced apart slots communicating with one edge of the bracket and a hole between the two spaced apart slots for engagement with a locking pin;
    a first handle portion having opposing end portions, two spaced apart parallel sides and a back defining a channel between the ends,
        each side having a handle flange at a first end portion extending opposite the channel for releasable engagement with the slots and channel defined by the bracket,
        a forward locking pin support in the channel proximate the first end portion defining a hole for a first end portion of an axially movable locking pin,
        a rear locking pin support within the channel spaced apart from the forward locking pin support defining a hole for second end portion of the locking pin,
        a thumb slide having a base portion communicating with the locking pin through an elongated hole defined in the back between the forward and rearward locking pin supports,
        a spring on the locking pin between the thumb slide base and a locking pin support biasing the locking pin so first end portion extends through the hole defined in the forward locking pin support to releasably engage with the hole defined in the bracket, and
        a locking bracket seat defined in the back at the second end portion for releasable engagement with a handle lock;
    a second handle portion having opposing end portions, two spaced apart parallel sides and a back defining a channel between the ends, having a first end portion pivotally interconnected to the second end portion of the first handle portion by a pin hinge extending through aligned holes defined in the sides,
        a handle lock carried in the channel proximate the first end spring biased toward engagement with the locking bracket seat; and
        a thumb grip operatively connected to the handle lock for a user to overcome the spring biasing so the first handle portion and second handle portion may be folded about the pin hinge.

2. The handle and bracket of claim 1 further comprising: plural spacedly arrayed cooling orifices defined in the sides and backs to reduce heat conduction and reduce mass.

3. The handle and bracket of claim 1 further comprising: washers between the adjacent sides on the pin hinge pivotally interconnecting the first and second handle portions.

4. The handle and bracket of claim 3 wherein: the washers are self lubricating.

5. The handle and bracket of claim 3 wherein: the washers reduce heat conduction from the one handle portion to the other handle portion.

6. The handle and bracket of claim 1 further comprising: finger flanges on the sides of the first handle portion opposite the back and proximate the second end portion to promote user comfort, the finger flanges extending perpendicularly to the sides and extending partially across the first handle portion channel.

7. The handle and bracket of claim 1 further comprising:
    a handle lock base within the channel of the second handle portion defining an alignment rod hole aligned with the channel;
    an alignment rod carried by the handle lock opposite end portion that engages with the locking bracket seat axially movable within the alignment rod hole;
    a handle lock guide interconnected to the handle lock base opposite the back defining an elongated hole through which the thumb grip extends; and
    a spring on the alignment rod biasing the handle lock to engagement with the locking bracket seat.

8. The handle and bracket of claim 1 further comprising:
a transverse horizontal ledge on the front locking pin support opposite the back extending toward the first end portion to strengthen engagement with the bracket.

9. The handle and bracket of claim 1 wherein:
angle of the handle flanges relative to the back is an obtuse angle.

10. The handle and bracket of claim 1 wherein:
angle of the handle flanges relative to the back is 111.85 degrees.

11. The handle and bracket of claim 1 wherein:
the bracket has two parallel spaced apart fastening tabs each fastening tab defining a hole for a fastener to engage with the cooking vessel;
two spaced apart offsetting bends between the fastening tabs; and
a medial portion communicating between the two offsetting bends opposite the fastening tabs defining the channel between the cooking vessel and the bracket for the handle flanges.

* * * * *